United States Patent
Yang et al.

(10) Patent No.: US 8,233,470 B2
(45) Date of Patent: Jul. 31, 2012

(54) MULTI-RADIO WIRELESS COMMUNICATION DEVICE METHOD FOR SYNCHRONIZING WIRELESS NETWORK AND BLUETOOTH COMMUNICATIONS

(75) Inventors: Xue Yang, Portland, OR (US); Eran Sudak, Tel Aviv (IL); Xingang Guo, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1129 days.

(21) Appl. No.: 11/770,200

(22) Filed: Jun. 28, 2007

(65) Prior Publication Data

US 2009/0003307 A1 Jan. 1, 2009

(51) Int. Cl.
*H04J 3/06* (2006.01)

(52) U.S. Cl. ........ 370/350; 370/503; 370/509; 370/510; 370/518; 370/520

(58) Field of Classification Search .................. 370/350, 370/503–520
See application file for complete search history.

(56) References Cited

U.S. PATENT DOCUMENTS

| | | | |
|---|---|---|---|
| 5,355,368 A | 10/1994 | Dore et al. | |
| 5,970,062 A | 10/1999 | Bauchot | |
| 6,141,336 A | 10/2000 | Bauchot et al. | |
| 6,285,662 B1 | 9/2001 | Watanabe et al. | |
| 6,795,418 B2 | 9/2004 | Choi | |
| 6,967,944 B2 | 11/2005 | Choi | |
| 7,280,836 B2 * | 10/2007 | Fuccello et al. | 455/452.1 |
| 7,725,118 B2 | 5/2010 | Yang et al. | |
| 2005/0170776 A1 | 8/2005 | Siorpaes | |
| 2006/0053229 A1 | 3/2006 | Choi et al. | |
| 2008/0207253 A1 * | 8/2008 | Jaakkola et al. | 455/550.1 |
| 2009/0003307 A1 | 1/2009 | Yang et al. | |
| 2009/0054009 A1 | 2/2009 | Yang et al. | |

FOREIGN PATENT DOCUMENTS

| | | |
|---|---|---|
| KR | 0082103 | 10/2003 |
| KR | 0010324 | 1/2007 |
| WO | WO-2009/006019 A2 | 1/2009 |
| WO | WO-2009006019 A3 | 1/2009 |
| WO | WO-2009006019 A4 | 1/2009 |

OTHER PUBLICATIONS

"U.S. Appl. No. 11/843,483, Notice of Allowance mailed Jan. 11, 2010", 8 Pgs.
International Application Serial No. PCT/US2008/067296, Search Report mailed Dec. 30, 2008, 3 pgs.
International Application Serial No. PCT/US2008/067296, Written Opinion mailed Dec. 30, 2008, 4 pgs.

* cited by examiner

*Primary Examiner* — Patrick Edouard
*Assistant Examiner* — Huy C Ho
(74) *Attorney, Agent, or Firm* — Schwegman, Lundberg & Woessner, P.A.; Gregory J. Gorrie

(57) ABSTRACT

Embodiments of a multi-radio wireless communication device and methods for synchronizing wireless network and Bluetooth (BT) communications are generally described herein. Other embodiments may be described and claimed. In some embodiments, a BT radio module adjusts a master clock signal by a predetermined step size before each subsequent BT transmission in response to a frame sync pulse from a wireless network radio module to reduce a time difference between subsequent frame sync pulses and synchronization reference points of BT slots.

23 Claims, 4 Drawing Sheets

MULTI-RADIO WIRELESS COMMUNICATION DEVICE METHOD FOR SYNCHRONIZING WIRELESS NETWORK AND BLUETOOTH COMMUNICATIONS

TECHNICAL FIELD

Some embodiments pertain to wireless communications. Some embodiments pertain to coexistence between wireless network communications and Bluetooth (BT) communications.

BACKGROUND

Multi-radio platforms are wireless communication devices with co-located transceivers that communicate using two or more communication techniques. One issue with multi-transceiver platforms is that interference between receptions and transmissions of the co-located transceivers may result in packet loss from collisions degrading the communication abilities of the co-located transceivers. This is especially a concern in multi-radio platforms that include wireless network transceivers, such as a wireless local area network (WLAN) or a Worldwide Interoperability for Microwave Access (WiMax) transceiver, and Bluetooth transceivers because their frequency spectrums can be adjacent or overlapping.

Thus, there are general needs for multi-radio platforms and methods that help to reduce packet loss resulting from collisions between the transmissions and receptions of different transceivers.

DETAILED DESCRIPTION

The following description and the drawings sufficiently illustrate specific embodiments of the invention to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in or substituted for those of other embodiments. Embodiments of the invention set forth in the claims encompass all available equivalents of those claims. Embodiments of the invention may be referred to herein, individually or collectively, by the term "invention" merely for convenience and without intending to limit the scope of this application to any single invention or inventive concept if more than one is in fact disclosed.

Figure 1:
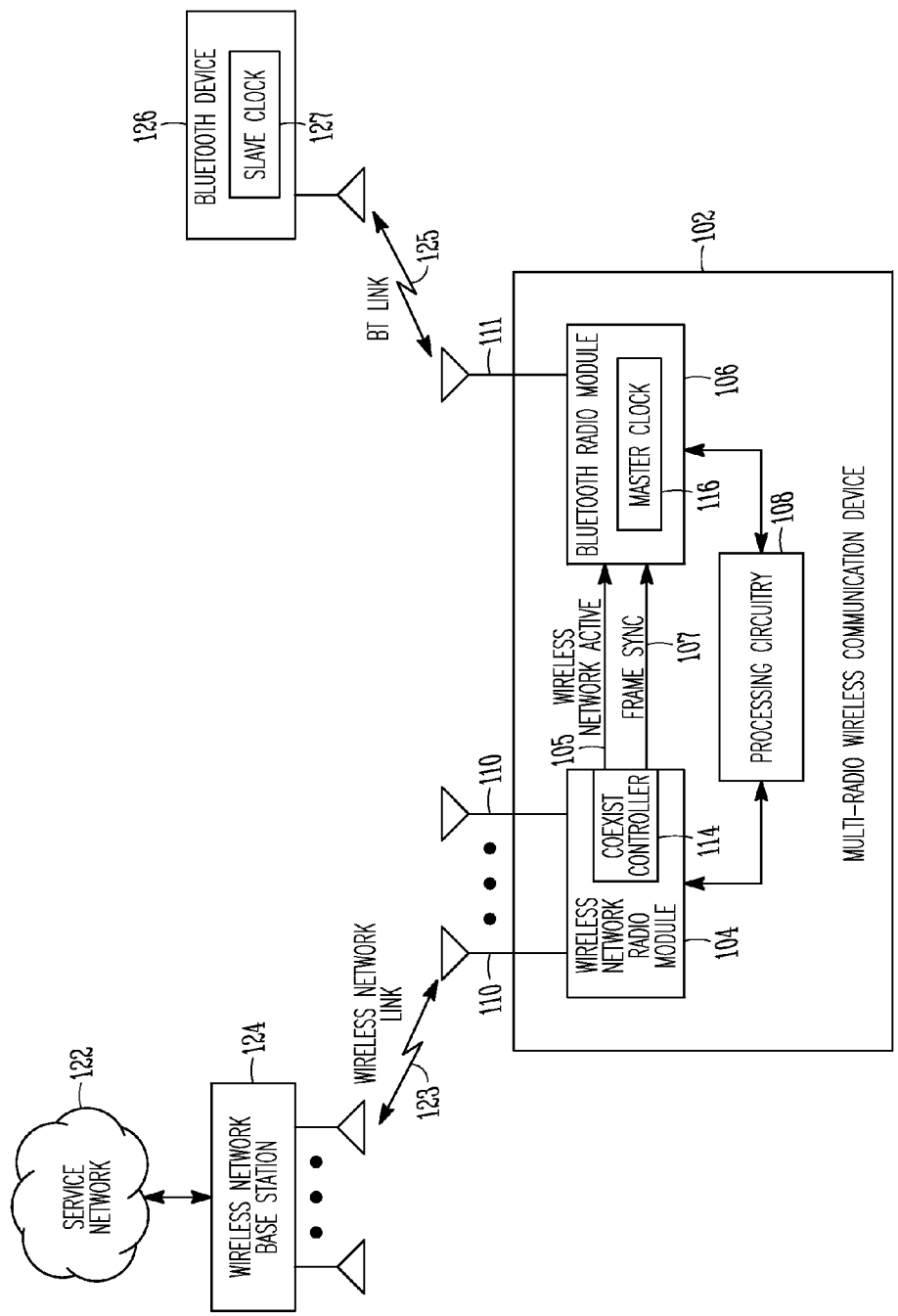
FIG. 1 illustrates a multi-radio wireless communication device in accordance with some embodiments of the present invention operating within a multi-radio wireless environment.

FIG. 1 illustrates a multi-radio wireless communication device in accordance with some embodiments of the present invention operating within a multi-radio wireless environment. Multi-radio wireless communication device 102 may provide wireless communications in accordance with two or more wireless communication techniques or standards. In the example embodiments illustrated in FIG. 1, multi-radio wireless communication device 102 may communicate with wireless network base station 124 and may communicate with Bluetooth (BT) device 126.

In some embodiments, multi-radio wireless communication device 102 may include wireless network radio module 104 for providing communications with wireless network base station 124 and BT radio module 106 for providing communications with BT device 126. In these embodiments, BT radio module 106 may establish BT link 125 with BT device 126 using antenna 111 and wireless network radio module 104 may establish wireless network link 123 with wireless network base station 124 using one or more antennas 110.

Multi-radio wireless communication device 102 may also include other circuitry (not illustrated) as well as processing circuitry 108 to coordinate the operations within multi-radio wireless communication device 102. In some embodiments, processing circuitry 108 may communicate information between BT radio module 106 and wireless network radio module 104. These embodiments are discussed in more detail below.

BT radio module 106 may include master clock 116 and BT device 126 may include slave clock 127. Master clock 116 and slave clock 127 may be substantially synchronous so that BT communications may take place over BT link 125. The synchronization of master clock 116 and slave clock 127 is discussed in more detail below.

In accordance with some embodiments, wireless network radio module 104 may generate frame sync pulse 107 for a frame of information communicated on wireless network link 123. In some embodiments, wireless network radio module 104 may generate frame sync pulse 107 once for every several frames of wireless network link 123. Frame sync pulse 107 may be relevant to the beginning of one of the frames. BT radio module 106 may adjust master clock 116 by a predetermined step size ($T_{step}$) before one or more subsequent BT transmissions to reduce a time difference between subsequent frame sync pulses and synchronization reference points of BT master slots to achieve substantial synchronization with the frames of wireless network link 123. These embodiments are discussed in more detail below.

In some embodiments, coexist controller 114 of wireless network radio module 104 may provide frame sync pulse 107. In these embodiments, coexist controller 114 may also provide wireless network active signal 105, discussed in more detail below.

In some embodiments, multi-radio wireless communication device 102 may relay information, such as voice, between BT device 126 and wireless network base station 124. For example, BT device 126 may be a BT headset and wireless network base station 124 may be coupled with service network 122 allowing voice information to be communicated (e.g., relayed) between the BT headset and a telephone network, although the scope of the invention is not limited in this respect. In some embodiments, Voice-over-Internet Protocol (VoIP) data may be communicated between wireless network base station 124 and service network 122, although the scope of the invention is not limited in this respect.

In some embodiments, audio content may be transferred from multi-radio wireless communication device 102 to BT device 126 while wireless network base station 124 is communicating with multi-radio wireless communication device 102, although the scope of the invention is not limited in this respect. In some embodiments, multi-radio wireless communication device 102 may be connecting to human interface BT device 126 while wireless network base station 124 is communicating with multi-radio wireless communication device 102, although the scope of the invention is not limited in this respect.

In some embodiments, multi-radio wireless communication device 102 may include additional radio modules. For example, when wireless network radio module 104 is a WiMax radio module, multi-radio wireless communication device 102 may include a WLAN or WiFi radio module, although the scope of the invention is not limited in this respect.

Although some embodiments of the present invention are described specifically with respect to WiMax and/or BT communications, the scope of the invention is not limited in this respect. Some embodiments apply to other types of synchronous communications that may be provided by a single multi-radio wireless communication device.

Although multi-radio wireless communication device 102 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements of multi-radio wireless communication device 102 may refer to one or more processes operating on one or more processing elements.

In some embodiments, multi-radio wireless communication device 102 and/or BT device 126 may be portable wireless communication devices, such as a personal digital assistant (PDA), a laptop or portable computer with wireless communication capability, a web tablet, a wireless or cellular telephone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, BT radio module 106 and BT device 126 may communicate in accordance with a short-range wireless standard such as the Bluetooth® short-range digital communication protocol, although the scope of the invention is not limited in this respect.

In some embodiments, wireless network radio module 104 and wireless network base station 124 may communicate in accordance with specific communication standards, such as the Institute of Electrical and Electronics Engineers (IEEE) standards including IEEE 802.11(a), 802.11(b), 802.11(g), 802.11(h) and/or 802.11(n) standards and/or proposed specifications for WLANs, although the scope of the invention is not limited in this respect as they may also be suitable to transmit and/or receive communications in accordance with other techniques and standards. In some embodiments, wireless network radio module 104 and wireless network base station 124 may communicate in accordance with the IEEE 802.16-2004 and the IEEE 802.16(e) standards for wireless metropolitan area networks (WMANs) including variations and evolutions thereof, although the scope of the invention is not limited in this respect as they may also be suitable to transmit and/or receive communications in accordance with other techniques and standards. For more information with respect to the IEEE 802.11 and IEEE 802.16 standards, please refer to "IEEE Standards for Information Technology—Telecommunications and Information Exchange between Systems"—Local Area Networks—Specific Requirements—Part 11 "Wireless LAN Medium Access Control (MAC) and Physical Layer (PHY), ISO/IEC 8802-11: 1999", and Metropolitan Area Networks—Specific Requirements—Part 16: "Air Interface for Fixed Broadband Wireless Access Systems," May 2005 and related amendments/versions.

Antennas 110 and antenna 111 may comprise one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input, multiple-output (MIMO) embodiments, wireless network radio module 104 may use two or more of antennas 110 that may be effectively separated to take advantage of spatial diversity and the different channel characteristics that may result between each of antennas 110 and wireless network base station 124.

Figure 2:
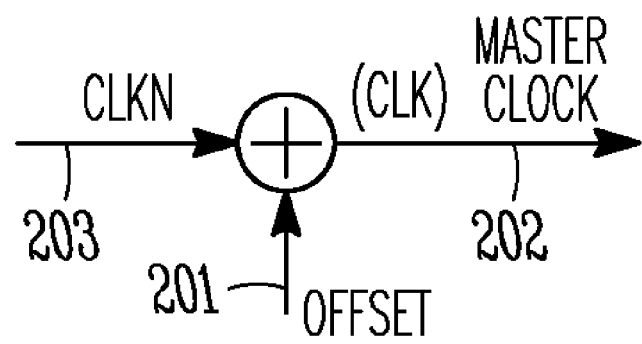
FIG. 2 illustrates the generation of a master clock signal in a Bluetooth radio module in accordance with some embodiments of the present invention.

FIG. 2 illustrates the generation of a master clock signal in a BT radio module in accordance with some embodiments of the present invention. Master clock signal 202 may be generated by master clock 116 (FIG. 1) and may be derived from native clock (CLKN) 203 by adding offset 201. A similar configuration may be provided for slave clock 127 (FIG. 1) allowing slave clock 127 to synchronize with master clock 116 by applying an offset generated based on receipt of transmissions from the master device.

BT devices use their internal clock (CLK) to schedule their transmissions and receptions. The CLK may be derived from the device's native clock (CLKN) by adding an offset, such as offset 201. According to the BT specification, the offset for the master device is zero so that the master clock is identical to the master device's native clock. Each slave device, on the other hand, adds an appropriate offset to its native clock to synchronize with the clock of the master. Some embodiments of the present invention exploit the clock generation mechanism of the BT specification by applying offset 201 to native clock 203 of a master device to achieve synchronization with wireless network communications. These embodiments are discussed in more detail below.

Because BT devices provide for an uncertainty window around their receive timing, BT slave devices are able to receive packets and adjust their clock to the master clock within the uncertainty window. For example, when the uncertainty window is +/−10 microseconds (μs), a receive packet that arrives up to 10 μs earlier or 10 μs later with reference to its receive timing should be correctly received. At the same time, if the slave device's receive timing drifts based on the master clock, so will its transmit timing.

Figure 3:
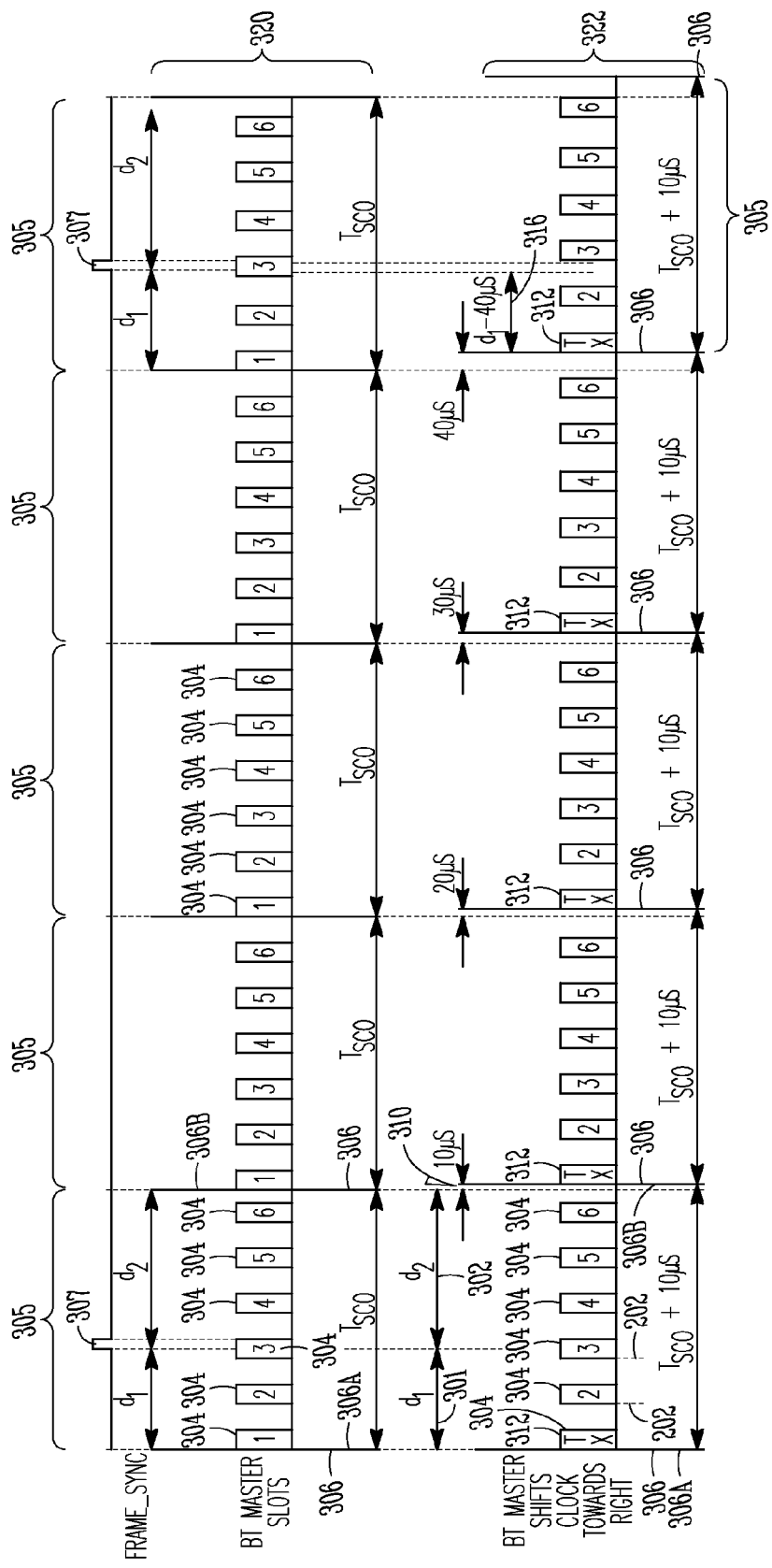
FIG. 3 illustrates the synchronization of signals of wireless network and Bluetooth radio modules in accordance with some embodiments of the present invention.

FIG. 3 illustrates the synchronization of signals of wireless network and BT radio modules in accordance with some embodiments of the present invention. Portion 320 of FIG. 3 illustrates an out-of-sync situation between a wireless network radio module and a BT radio module. Portion 322 of FIG. 3 illustrates the shifting of a BT master clock to attempt to achieve synchronization with wireless network communications. As illustrated in FIG. 3, frame sync pulses 307 may correspond to frame sync pulses 107 (FIG. 1) and may be provided by coexist controller 114 (FIG. 1) of wireless network radio module 104 (FIG. 1).

Referring to FIGS. 1-3 together, in accordance with some embodiments, wireless-network radio module 104 may generate frame sync pulses 307 associated with a wireless network frame and BT radio module 106 may adjust master clock signal 202 for communications with BT device 126 by a predetermined step size ($T_{step}$) 310 before each subsequent BT transmission 312 in response to frame sync pulse 307 to reduce a time difference between subsequent frame sync pulses 307 and synchronization reference points 306 of BT slots 304.

Synchronization reference points 306 may define the beginning of each BT interval 305. As illustrated, each BT interval 305 may comprise one or several (e.g., six) BT slots 304, labeled #1 through #6. In some embodiments, BT intervals 305 may be referred to as $T_{SCO}$ intervals, although the scope of the invention is not limited in this respect. BT slots 304 may be referred to as BT master slots with respect to a master device, such as BT radio module 106, which may be the device in control of communications between the master device and a slave device, such as BT device 126.

Wireless network radio module 104 and wireless network base station 124 may communicate over link 123 using frames. In some embodiments, wireless network radio module 104 may generate frame sync pulse 307 for each frame, while in other embodiments, wireless network radio module 104 may generate frame sync pulse 307 once for every several frames. Frame sync pulse 307 may be periodic, although the scope of the invention is not limited in this respect. The duration of each of the frames may be an integer multiple of BT slots 304, although the scope of the invention is not limited in this respect.

In some embodiments, the frames may be time-division multiplexed (TDM) frames or time-division duplex (TDD) frames. In some WLAN embodiments, the frames may be orthogonal frequency division multiplexed (OFDM) frames. In some WiMax embodiments, the frames may be orthogonal frequency division multiple access (OFDMA) frames, although the scope of the invention is not limited in this respect.

In some embodiments, wireless network radio module 104 may be a WLAN radio module. In some embodiments, wireless network radio module 104 may be a broadband wireless access (BWA) network module, such as a WiMax radio module.

In some embodiments, BT radio module 106 may calculate first time difference ($d_1$) 301 between frame sync pulse 307 and a prior synchronization reference point 306A and may calculate second time difference ($d_2$) 302 between frame sync pulse 307 and a subsequent synchronization reference point 306B. When first time difference 301 is less than or equal to second time difference 302 (i.e., $d_1 \leq d_2$), BT radio module 106 may retard master clock signal 202 by predetermined step size 310 (i.e., $T_{step}$) to shift BT slots 304 to achieve substantial synchronization of synchronization reference points 306 and a subsequent frame sync pulse 307. Eventually, synchronization reference points 306 may reach substantial synchronization with a subsequent frame sync pulse 307. When first time difference 301 is greater than the second time difference 302 (i.e., $d_1 > d_2$), BT radio module 106 may advance master clock signal 202 by predetermined step size 310 to shift BT slots 304 to achieve substantial synchronization of synchronization reference points 306 and frame sync pulse 307.

In some embodiments, when first time difference 301 is less than or equal to second time difference 302, BT radio module 106 may retard master clock signal 202 by providing a positive offset 201 (e.g., up to +10 µs) to shift the positions of one or more of BT slots 304 within BT interval 305 by predetermined step size 310 to achieve substantial synchronization of synchronization reference points 306 and a subsequent frame sync pulse 307. When first time difference 301 is greater than second time difference 302, BT radio module 106 may advance master clock signal 202 by providing a negative offset 201 (e.g., up to −10 µs) to shift the positions of one or more of BT slots 304 within BT interval 305 by the predetermined step size 310 to achieve substantial synchronization of synchronization reference points 306 and a subsequent frame sync pulse 307.

In some embodiments, BT radio module 106 may refrain from either advancing or retarding master clock signal 202 for synchronization with frame sync pulse 307 when time difference 316 between a subsequent frame sync pulse 307 and one or more of synchronization reference points 306 is less than a predetermined value. In these embodiments, substantial synchronization of synchronization reference points 306 and frame sync pulse 307 may be achieved when time difference 316 between subsequent frame sync pulses 307 and synchronization reference points 306 is less than a predetermined value. In the illustrated example, this may occur sometime after the last interval illustrated in FIG. 3.

In some embodiments, BT radio module 106 may adjust master clock signal 202 for a predetermined number of BT slots 304 or until receipt of a next frame sync pulse 307. Upon receipt of the next frame sync pulse 307, the time differences may be recalculated to determine whether the time difference between the subsequent frame sync pulses 307 and synchronization reference points 306 is minimized or less than a predetermined value. In some embodiments, BT radio module 106 may continue to adjust master clock signal 202 for subsequent BT slots 304, although the scope of the invention is not limited in this respect.

In some embodiments, BT radio module 106 may re-calculate first and second time differences 301 and 302 in response to receipt of a subsequent frame sync pulse 307 and may continue to either advance or retard the master clock signal by predetermined step size 310 until substantial synchronization of synchronization reference points 306 and a subsequent frame sync pulse is achieved. Because of clock drift and because the relative position of frame sync pulses 307, some embodiments of the present invention may re-calculate the first and second time differences each time a frame sync pulse 307 is observed, although the scope of the invention is not limited in this respect. In some alternate embodiments, BT radio module 106 re-calculates the first and second time differences every BT interval 305, although the scope of the invention is not limited in this respect.

In some alternate embodiments, BT radio module 106 may calculate a number of BT masters slots 304 to achieve substantial synchronization. In these embodiments, BT radio module 106 may continue to either advance or retard the master clock signal by the predetermined step size 310 once for each BT interval 305. In these alternate embodiments, BT radio module 106 may refrain from calculating the first and second time difference in response to receipt of subsequent frame sync pulses 307 until the calculated number of BT masters slots have passed to achieve synchronization.

In some embodiments, BT device 126 operating as a slave device either advances or retards slave clock 127 in response to receipt of the BT transmission 312 from BT radio module 106. Predetermined step size 310 may be less than or equal to a maximum value that the BT device is permitted to adjust its slave clock. In some embodiments, the maximum value of the predetermined step size is 10 µs, although the scope of the invention is not limited in this respect. In some embodiments, a smaller step size may be used (e.g., 8-9 µs) to tolerate clock drift of either master clock 116 or slave clock 127 resulting in a slightly greater synchronization time.

In some embodiments, when wireless network radio module 104 is a WiMax radio module, it may establish an OFDMA link for communicating within OFDMA frames with a WiMax base station. In these embodiments, the WiMax radio module generates a frame sync pulse for one or more OFDMA frames. Each frame sync pulse may be relevant to the beginning of one of the OFDMA frames. The duration of each of the OFDMA frames may be an integer multiple of BT slots 304.

In some embodiments, BT radio module 106 may establish a BT synchronous connection oriented (SCO) link with BT device 126. BT radio module 106 adjusts master clock signal 202 for synchronous communications over the BT SCO link by the predetermined step size 310 before each subsequent BT transmission 312 over the BT SCO link until substantial synchronization of synchronization reference points 306 and frame sync pulse 307 is achieved. In some embodiments, BT radio module 106 may establish an extended SCO (eSCO) link with BT device 126, although the scope of the invention is not limit in this respect.

In some embodiments, in response to receipt of the wireless network active signal 105, BT radio module 106 may refrain from transmitting to BT device 126 or may interrupt a current BT transmission to or reception from BT device 126. In some embodiments, coexist controller 114 may condition generating wireless network active signal 105 based on the type of WiMAX operations (e.g., whether transmitting or receiving). In some embodiments, coexist controller 114 may consider inputs from BT radio module 106 when determining whether to generate wireless network active signal 105. In some embodiments, when the current BT transmission to the BT device 126 is interrupted by receipt of the wireless network active signal 105, BT radio module 106 may enter a retransmit state, although the scope of the invention is not limited in this respect.

In some embodiments, BT radio module 106 may establish BT link 125 with BT device 126 and the wireless network radio module 104 may establish wireless network link 123 with wireless network base station 124. In these embodiments, when BT link 125 is established prior to wireless network link 123, BT radio module 106 may synchronize with wireless network link 123 as discussed above by adjusting master clock signal 202 by the predetermined step size 310 for one or more BT slots 304. When BT link 125 has not been established prior to the wireless network link 123, BT radio module 106 may establish BT link 125 to be initially synchronized with wireless network link 123.

In some embodiments, BT device 126 may comprise a BT headset and multi-radio communication device 102 may relay voice packets between BT device 126 and wireless network base station 124. In some embodiments, wireless network base station 124 may communicate voice packets as a VoIP packet with service network 122, although the scope of the invention is not limited in this respect.

In accordance with some embodiments, step size 310 ($T_{step}$) should be no more than a predetermined amount, such as 10 µs, so that the slave device may be able to follow master clock 116 and achieve the synchronization accordingly.

Step size may desirably be as large as possible (i.e., 10 µs) to minimize the synchronization convergence time. However, when considering the clock drift at master and slave, step size 310 may be set smaller. According to the BT Specification, the average timing shall not drift faster than 20 parts-per million (ppm) relative to the ideal timing. Also, the instantaneous timing shall not deviate more than 1 µs from the average timing. In the worst case, assuming 20 ppm of clock drift for both the BT master and slave in opposite directions, and 1 µs of instantaneous deviation, these add up to 1.15 µs clock difference between BT master and slave every 3.75 milliseconds (ms). Therefore, in embodiments that use an SCO link, step size 310 may be set to be less than approximately 8.85 µs. In general, a smaller step size may help tolerate more clock drift at the price of longer synchronization convergence time. When BT master refrains from transmitting due to the presence of wireless network activities, the synchronization process may take longer.

In the case of either a BT eSCO link or a BT Asynchronous Connection-Less (ACL), some embodiments of the present invention may include optimization techniques to help expedite the synchronization process. For example, the BT master device may use every master-to-slave slot to transmit a frame to the slave device. The frame can be a data frame, retransmitted data frame, or NULL frame when there is no data to send.

Figure 4:
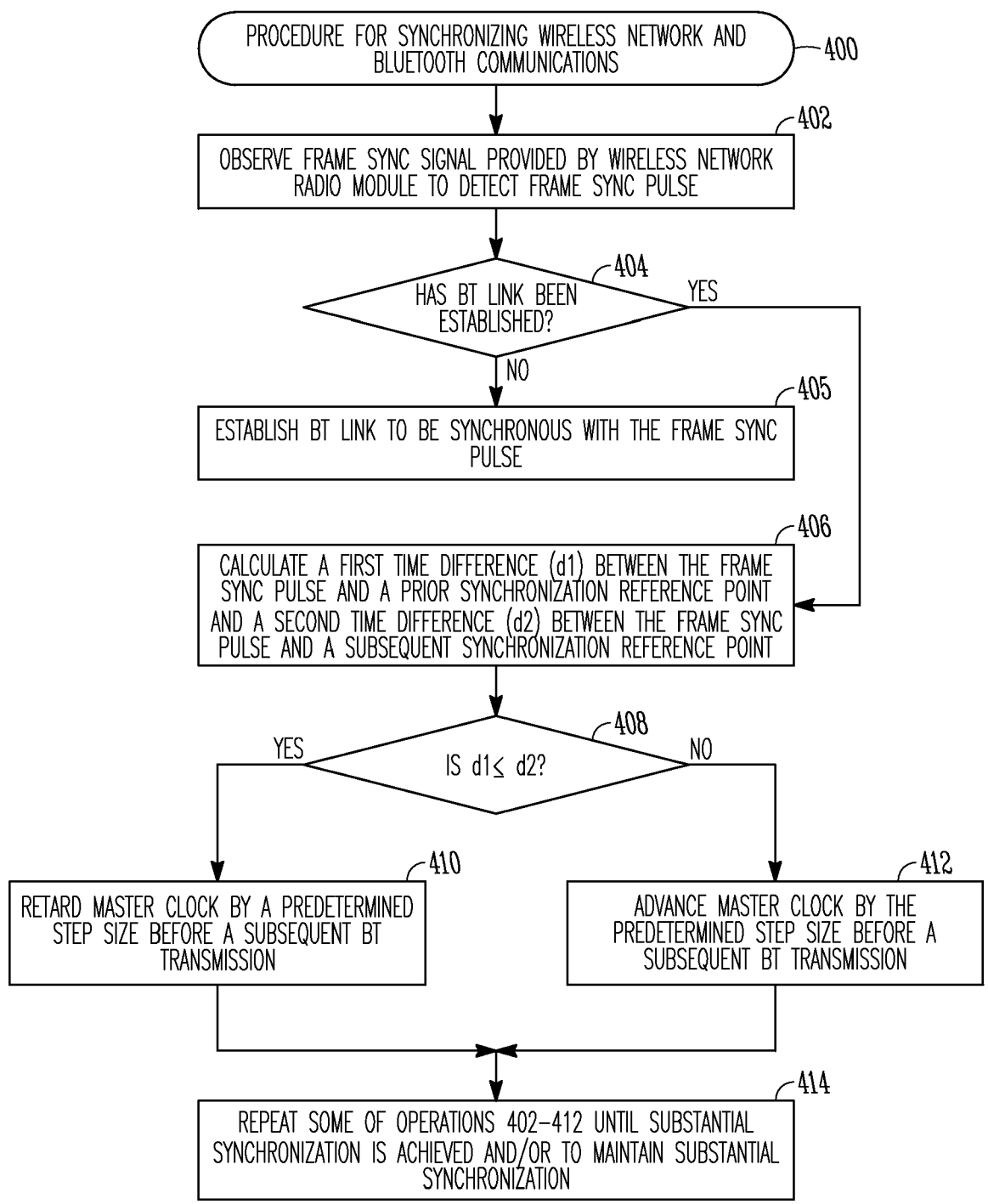
FIG. 4 is a flow chart of a procedure for synchronizing wireless network and Bluetooth communications in accordance with some embodiments of the present invention.

FIG. 4 is a flow chart of a procedure for synchronizing wireless network and BT communications in accordance with some embodiments of the present invention. Procedure 400 may be performed by a BT radio module operating as part of a multi-radio wireless communication device when the BT radio module is operating as a master device. For example, procedure 400 may be performed by BT radio module 106 (FIG. 1) operating within multi-radio wireless communication device 102 (FIG. 1).

In operation 402, the BT radio module observes a frame sync signal provided by a wireless network radio module to detect a frame sync pulse, such as frame sync pulse 307 (FIG. 3). The observation of a frame sync pulse indicates that a wireless network link, such as wireless network link 123 (FIG. 1) is established.

In operation 404, the BT radio module determines whether or not a BT link, such as BT link 125 (FIG. 1), has already been established. If a BT link has already been established, operations 406 through 414 may be performed to synchronize the BT link with the wireless network link. If a BT link has not been established, operation 405 may be performed.

In operation 405, the BT radio module may initially establish a BT link to be substantially synchronous with the frame sync pulse provided by the wireless network radio module.

In operation 406, the BT radio module calculates a first time difference between the frame sync pulse and a prior synchronization reference point and calculates a second time difference between the frame sync pulse and a subsequent synchronization reference point.

In operation 408, the BT radio module determines whether the first time difference is less than or equal to the second time difference. When the first time difference is less than or equal to the second time difference, operation 410 is performed. When first time difference is not less than or equal to the second time difference, operation 412 is performed.

In operation 410, the BT radio module retards the master clock signal by the predetermined step size to shift BT slots to achieve substantial synchronization of the synchronization reference points and a subsequent frame sync pulse.

In operation 412, the BT radio module advances the master clock signal by the predetermined step size to shift the BT slots to achieve substantial synchronization of the synchronization reference points and the frame sync pulses.

In operation 414, some of operations 402 through 412 may be repeated to achieve substantial synchronization of the synchronization reference points and the frame sync pulses and/or to maintain substantial synchronization of the synchronization reference points and the frame sync pulses.

Although the individual operations of procedure 400 are illustrated and described as separate operations, one or more of the individual operations may be performed concurrently, and nothing requires that the operations be performed in the order illustrated.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, a computing device includes one or more processing elements coupled with computer-readable memory that may be volatile or non-volatile memory or a combination thereof.

Embodiments of the invention may be implemented in one or a combination of hardware, firmware, and software. Embodiments of the invention may also be implemented as instructions stored on a machine-readable medium, which may be read and executed by at least one processor to perform the operations described herein. A machine-readable medium may include any non-transitory mechanism for storing information in a form readable by a machine (e.g., a computer). For example, a machine-readable medium may include read-only memory (ROM), random-access memory (RAM), magnetic disk storage media, optical storage media, flash-memory devices, and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A multi-radio wireless communication device comprising:
   a Bluetooth (BT) radio module to establish a BT link with a BT device; and
   a wireless-network radio module to generate a frame sync pulse associated with a frame of an OFDMA wireless network link and to provide the frame sync pulse to the BT radio module,
   wherein when the BT link is established prior to the wireless network link, the BT radio module is configured to adjust a master clock signal associated with the BT link by a predetermined step size before each first BT transmission of a BT interval in response to the frame sync pulse to shift positions of BT slots of the BT interval until a time difference between subsequent frame sync pulses and a synchronization reference point of one of the BT slots of the BT interval is reduced to less than a predetermined value,
   wherein the predetermined step size is no greater than a maximum value that the BT device is configured to adjust its slave clock to allow the BT link to be maintained with the BT device during the adjustment of the master clock signal, and
   wherein when the BT link is not established prior to the wireless network link, the BT radio module establishes the BT link to be initially synchronized with the wireless network link such that the time difference between subsequent frame sync pulses and a synchronization reference point of one of the BT slots of the BT interval is less than the predetermined value.

2. The wireless communication device of claim 1 wherein the BT radio module calculates a first time difference between the frame sync pulse and a prior synchronization reference point and calculates a second time difference between the frame sync pulse and a subsequent synchronization reference point, and
   wherein when the first time difference is less than or equal to the second time difference, the BT radio module retards the master clock signal by the predetermined step size to shift the BT slots to achieve substantial synchronization of the synchronization reference points and a subsequent frame sync pulse.

3. The device of claim 2 wherein when the first time difference is greater than the second time difference, the BT radio module advances the master clock signal by the predetermined step size to shift the BT slots to achieve substantial synchronization of the synchronization reference points and the frame sync pulses.

4. The device of claim 3 wherein when the first time difference is less than or equal to the second time difference, the BT radio module retards the master clock signal by providing a positive offset to shift positions of one or more of the BT slots within a BT interval by the predetermined step size to achieve substantial synchronization of the synchronization reference points and a subsequent frame sync pulse, and
   wherein when the first time difference is greater than the second time difference, the BT radio module advances the master clock signal by providing a negative offset to shift positions of one or more of the BT slots within the BT interval by the predetermined step size to achieve substantial synchronization of the synchronization reference points and a subsequent frame sync pulse.

5. The device of claim 3 wherein the BT radio module refrains from advancing or retarding the master clock signal for synchronization with the frame sync pulses when a time difference between a subsequent frame sync pulse and one or more of the synchronization reference points is less than a predetermined value.

6. The device of claim 5 wherein the BT radio module re-calculates the first and second time difference in response to receipt of a subsequent frame sync pulse and continues to either advance or retard the master clock signal by the predetermined step size until substantial synchronization of the synchronization reference points and a subsequent frame sync pulse is achieved.

7. The device of claim 1 wherein the BT device adjusts a slave clock within the BT device in response to receipt of the BT transmission from the BT radio module.

8. The device of claim 7 wherein the wireless network radio module is a Worldwide Interoperability for Microwave Access (WiMax) radio module and establishes the OFDMA wireless network link for communicating within OFDMA frames with a WiMax base station,
   wherein the WiMax module generates a frame sync pulse for one or more OFDMA frames, each frame sync pulse being relevant to a beginning of one of the OFDMA frames, and
   wherein a duration of each of the OFDMA frames is an integer multiple of the BT slots.

9. The device of claim 8 wherein the BT radio module establishes a BT synchronous connection oriented (SCO) link with the BT device, and wherein the BT radio module adjusts the master clock signal for synchronous communications over the BT SCO link by the predetermined step size before each subsequent BT transmission over the BT SCO link until substantial synchronization of the synchronization reference points and the frame sync pulses is achieved.

10. The device of claim 9 wherein the WiMax radio module comprises a coexist controller to generate the frame sync pulses and to generate a wireless network active signal when the wireless network radio module is either transmitting or receiving,
wherein in response to receipt of the wireless network active signal, the BT radio module refrains from transmitting to the BT device or interrupts a current BT transmission to the BT device.

11. The device of claim 1 wherein the BT radio module establishes the BT link with the BT device and the wireless network radio module establishes the wireless network link with a wireless network base station.

12. The device of claim 11 wherein the BT device comprises a BT headset and wherein the multi-radio communication device relays voice packets between the BT device and the wireless network base station, and
wherein the wireless network base station communicates the voice packet as a Voice-over-Internet-Protocol (VoIP) packet with a service network.

13. A method of synchronizing wireless network and Bluetooth (BT) communications to enable coexistence therebetween comprising:
generating, by a wireless-network radio module, a frame sync pulse associated with a frame for wireless network communications over an OFDMA wireless network link; and
providing the frame sync pulse to a Bluetooth (BT) radio module,
wherein when a BT link is established prior to the wireless network link, the method further comprises:
adjusting, by the BT radio module, a master clock signal for communicating over the BT link by a predetermined step size before each first BT transmission of a BT interval in response to the frame sync pulse to shift positions of BT slots of the BT interval until a time difference between subsequent frame sync pulses and a synchronization reference point of one of the BT slots of the BT interval is reduced to less than a predetermined value,
wherein the predetermined step size is no greater than a maximum value that the BT device is configured to adjust its slave clock to allow the BT link to be maintained with the BT device during the adjustment of the master clock signal, and
wherein when the BT link is not established prior to the wireless network link, the method further comprises establishing, by the BT radio module, the BT link to be initially synchronized with the wireless network link.

14. The method of claim 13 further comprising:
calculating a first time difference between the frame sync pulse and a prior synchronization reference point; and
calculating a second time difference between the frame sync pulse and a subsequent synchronization reference point,
wherein when the first time difference is less than or equal to the second time difference, the method further comprises retarding a master clock signal by the predetermined step size to shift the BT slots to achieve substantial synchronization of the synchronization reference points and a subsequent frame sync pulse.

15. The method of claim 14 wherein when the first time difference is greater than the second time difference, the method further comprises advancing the master clock signal by the predetermined step size to shift the BT slots to achieve substantial synchronization of the synchronization reference points and the frame sync pulses.

16. The method of claim 15 wherein when the first time difference is less than or equal to the second time difference, the master clock signal is retarded by providing a positive offset to shift positions of one or more of the BT slots within a BT interval by the predetermined step size to achieve substantial synchronization of the synchronization reference points and a subsequent frame sync pulse, and
wherein when the first time difference is greater than the second time difference, the master clock signal is advanced by providing a negative offset to shift positions of one or more of the BT slots within the BT interval by the predetermined step size to achieve substantial synchronization of the synchronization reference points and a subsequent frame sync pulse.

17. The method of claim 13 wherein the BT device adjusts a slave clock within the BT device in response to receipt of the BT transmission from the BT radio module.

18. A multi-radio wireless communication system comprising:
a Bluetooth (BT) radio module to establish a BT synchronous connection oriented (SCO) link; and
a WiMax radio module to establish an OFDMA communication link with a WiMax base station using one or more antennas and to generate a frame sync pulse associated with OFDMA frames communicated over the OFDMA communication link, the WiMax radio module configured to provide the frame sync pulse to the BT radio module,
wherein when the BT SCO link is established prior to the OFDMA communication link, the BT radio module is configured to adjust a master clock signal by a predetermined step size before each first BT transmission of a BT interval of the BT SCO link in response to the frame sync pulse to shift positions of BT slots of the BT interval until a time difference between subsequent frame sync pulses and a synchronization reference point of one of the BT slots of the BT interval is reduced to less than a predetermined value,
wherein the predetermined step size is no greater than a maximum value that the BT device is configured to adjust its slave clock to allow the BT SCO link to be maintained with the BT device during the adjustment of the master clock signal, and
wherein when the BT SCO link is not established prior to the OFDMA communication link, the BT radio module establishes the BT SCO link to be initially synchronized with the OFDMA communication link.

19. The system of claim 18 wherein the BT radio module calculates a first time difference between the frame sync pulse and a prior synchronization reference point and calculates a second time difference between the frame sync pulse and a subsequent synchronization reference point, and
wherein when the first time difference is less than or equal to the second time difference, the BT radio module retards the master clock signal by the predetermined step size to shift the BT slots to achieve substantial synchronization of the synchronization reference points and a subsequent frame sync pulse.

20. The system of claim 19 wherein when the first time difference is greater than the second time difference, the BT radio module advances the master clock signal by the predetermined step size to shift the BT slots to achieve substantial synchronization of the synchronization reference points and the frame sync pulses, wherein when the first time difference is less than or equal to the second time difference, the BT radio module retards the master clock signal by providing a positive offset to shift positions of one or more of the BT slots within a BT interval by the predetermined step size to achieve substantial synchronization of the synchronization reference points and a subsequent frame sync pulse, and wherein when the first time difference is greater than the second time difference, the BT radio module advances the master clock signal by providing a negative offset to shift positions of one or more of the BT slots within the BT interval by the predetermined step size to achieve substantial synchronization of the synchronization reference points and a subsequent frame sync pulse.

21. A computer-readable storage device comprising instructions, which when implemented by one or more processors, synchronize wireless network and Bluetooth (BT) communications to enable coexistence therebetween, the one or more processors to:

generate a frame sync pulse associated with a frame for wireless network communications over an OFDMA wireless network link; and provide the frame sync pulse to a Bluetooth (BT) radio module, wherein when a BT link is established prior to the wireless network link, the one or more processors are further configured to cause the BT radio module to adjust a master clock signal for communicating over the BT link by a predetermined step size before each first BT transmission of a BT interval in response to the frame sync pulse to shift positions of BT slots of the BT interval until a time difference between subsequent frame sync pulses and a synchronization reference point of one of the BT slots of the BT interval is reduced to less than a predetermined value, wherein the predetermined step size is no greater than a maximum value that the BT device is configured to adjust its slave clock to allow the BT link to be maintained with the BT device during the adjustment of the master clock signal, and wherein when the BT link is not established prior to the wireless network link, the one or more processors are further configured to cause the BT radio module to establish the BT link to be initially synchronized with the wireless network link.

22. The computer-readable storage device of claim 21 wherein the instructions, when further implemented cause the one or more possessors to:

calculate a first time difference between the frame sync pulse and a prior synchronization reference point; and calculate a second time difference between the frame sync pulse and a subsequent synchronization reference point, wherein when the first time difference is less than or equal to the second time difference, the instructions further cause the one or more possessors to retard a master clock signal by the predetermined step size to shift the BT slots to achieve substantial synchronization of the synchronization reference points and a subsequent frame sync pulse.

23. The computer-readable storage device of claim 22 wherein when the first time difference is greater than the second time difference, the instructions further cause the one or more possessors to advance the master clock signal by the predetermined step size to shift the BT slots to achieve substantial synchronization of the synchronization reference points and the frame sync pulses.

* * * * *

UNITED STATES PATENT AND TRADEMARK OFFICE
CERTIFICATE OF CORRECTION

PATENT NO. : 8,233,470 B2  Page 1 of 1
APPLICATION NO. : 11/770200
DATED : July 31, 2012
INVENTOR(S) : Yang et al.

It is certified that error appears in the above-identified patent and that said Letters Patent is hereby corrected as shown below:

On the face page, in column 2, under "U.S. Patent Documents", line 1, In the citation of US Patent 7,725,118, After "7,725,118 B2 5/2010 Yang et al.", insert
--US-20020136183 A1 9/26/2002 Chen et al.
US-20030036354 A1 2/20/2003 Lee et al.
US-20040223467 A1 11/11/2004 Hundal et al.--, therefor On the face page, in column 2, under "U.S. Patent Documents", line 3, In the citation of US Patent 20060053229 A1, After "20060053229 A1 3/2006 Choi et al.", insert
--20070023358 A1 2/2007 Boyd et al.--, therefor On the face page, in column 2, under "Other Publications", line 6, after "International Application Serial No. PCT/US2008/067296, Written Opinion mailed Dec. 30, 2008, 4 pgs.", insert
--"European Application Serial No. 08771324.4, Extended European Search Report Response filed Jan. 23, 2012", 5 pgs.
European Application Serial No. 08771324.4, Extended European Search Report mailed Jun. 28, 2011", 7 pgs.--, therefor Signed and Sealed this
Fourth Day of December, 2012

David J. Kappos
*Director of the United States Patent and Trademark Office*